(12) United States Patent
Ramesh et al.

(10) Patent No.: US 6,861,150 B2
(45) Date of Patent: *Mar. 1, 2005

(54) RHEOLOGY CONTROL AGENT, A METHOD OF PREPARING THE AGENT, AND A COATING COMPOSITION UTILIZING THE AGENT

(75) Inventors: Swaminathan Ramesh, Canton, MI (US); Marvin L Green, Brighton, MI (US)

(73) Assignee: BASF Corporation, Southfield, MI (US)

( * ) Notice: Subject to any disclaimer, the term of this patent is extended or adjusted under 35 U.S.C. 154(b) by 237 days.

This patent is subject to a terminal disclaimer.

(21) Appl. No.: 10/206,466

(22) Filed: Jul. 26, 2002

(65) Prior Publication Data

US 2003/0009052 A1 Jan. 9, 2003

Related U.S. Application Data

(63) Continuation-in-part of application No. 10/122,509, filed on Apr. 16, 2002, and a continuation-in-part of application No. 10/106,000, filed on Mar. 25, 2002, and a continuation-in-part of application No. 09/793,289, filed on Feb. 26, 2001, now Pat. No. 6,462,144.

(51) Int. Cl.$^7$ ............................................... B32B 27/36
(52) U.S. Cl. .................... 428/480; 428/482; 428/423.1; 525/471
(58) Field of Search ................................. 428/480, 482, 428/423.1, 423; 525/471

(56) References Cited

U.S. PATENT DOCUMENTS

| | | | |
|---|---|---|---|
| 4,220,575 A | * 9/1980 | Wallace | ....................... 524/311 |
| 4,224,080 A | 9/1980 | Chambers et al. | |
| 4,311,622 A | 1/1982 | Buter | ......................... 260/18 |
| 4,839,406 A | 6/1989 | Natura et al. | ................ 524/196 |
| 4,851,294 A | 7/1989 | Buter et al. | .............. 428/425.8 |
| 4,859,743 A | 8/1989 | Amorose et al. | .............. 525/81 |
| 5,378,762 A | 1/1995 | Czornij et al. | |
| 5,389,139 A | 2/1995 | Carpenter et al. | |
| 5,603,865 A | 2/1997 | DePue et al. | |
| 5,605,965 A | 2/1997 | Rehfuss et al. | .............. 525/100 |
| 5,629,374 A | 5/1997 | Budde et al. | |
| 5,665,433 A | 9/1997 | Moussa et al. | |
| 5,684,078 A | 11/1997 | Pfaffenschlager et al. | |
| 5,786,420 A | 7/1998 | Grandhee | |
| 5,872,195 A | 2/1999 | Green et al. | |
| 5,969,048 A | 10/1999 | Ito et al. | |
| 5,976,701 A | 11/1999 | Barancyk et al. | ......... 428/423.1 |
| 5,994,479 A | 11/1999 | Green et al. | ................. 525/481 |
| 6,080,825 A | 6/2000 | Ohrbom et al. | .............. 525/481 |
| 6,084,038 A | 7/2000 | Ohrbom et al. | .............. 525/481 |
| 6,111,001 A | 8/2000 | Barancyk et al. | ........... 524/211 |
| 6,228,953 B1 * | 5/2001 | Barancyk et al. | ........... 525/374 |
| 6,291,073 B1 | 9/2001 | Ohrbom et al. | |
| 6,326,420 B1 | 12/2001 | Olson et al. | |
| 6,376,596 B1 | 4/2002 | Barsotti et al. | |
| 6,462,144 B1 | 10/2002 | Ramesh et al. | |
| 6,515,192 B1 | 2/2003 | Rink et al. | |
| 6,649,705 B2 | 11/2003 | Ramesh | |
| 2002/0026015 A1 | 2/2002 | Ramesh | ....................... 525/437 |
| 2002/0156230 A1 | 10/2002 | Ramesh et al. | |
| 2003/0050432 A1 | 3/2003 | Ramesh et al. | |

FOREIGN PATENT DOCUMENTS

| | | | |
|---|---|---|---|
| DE | 19940855 | 3/2001 | ........... C08G/63/20 |
| EP | 0 767 226 | 9/1996 | ......... C09D/201/00 |
| GB | 1108261 | 4/1963 | |
| WO | WO99/35198 | 7/1999 | ......... C09D/201/02 |
| WO | WO00/31194 | 2/2000 | ............ C09D/5/04 |
| WO | WO0018516 | 4/2000 | ......... C09D/201/00 |
| WO | WO00/36049 | 6/2000 | ............ C09K/9/02 |
| WO | WO01/30877 | 5/2001 | ........... C08G/18/38 |
| WO | WO/146296 | 6/2001 | ........... C08G/83/00 |
| WO | WO 02/068553 | 9/2002 | ......... C09D/201/02 |

OTHER PUBLICATIONS

Brenner 1995, pp. 176–177, Hyperbranched polymers: modification with flexible chains.
Kim, p. 61,, Progress in hyperbranched, polymers.
OS Brokers Organic Coatings, A. Heeringa, et al. entitled "Sag control agents for rheology Control in automotive topcoats," 1984, Automotive Research department pp. 201–223.
Copy of the International Search Report for PCT/US 03/18121 filed Jun. 6, 2003.

* cited by examiner

*Primary Examiner*—James J. Seidleck
*Assistant Examiner*—Melanie Bissett

(57) ABSTRACT

The present invention is directed to a rheology control agent. The rheology control agent is used in a coating composition and is the reaction product of a first compound comprising a plurality of hydroxyl groups, of a lactone compound, and of a carbamate compound. The present invention is also directed to a coating composition including the rheology control agent and to a method of preparing the rheology control agent.

27 Claims, No Drawings

RHEOLOGY CONTROL AGENT, A METHOD OF PREPARING THE AGENT, AND A COATING COMPOSITION UTILIZING THE AGENT

RELATED APPLICATIONS

This application is a continuation-in-part of U.S. patent application Ser. Nos. 10/122,509, 10/106,000, and 09/793,289 which were filed on Apr. 16, 2002, Mar. 25, 2002, and Feb. 26, 2001 now U.S. Pat. No. 6,462,144, respectively. Furthermore, this application is related to assignee's copending United States Patent Application entitled "Polyester Resin With Carbamate Functionality, A Method Of Preparing The Resin, And A Coating Composition Utilizing The Resin" filed on the same date as the present application. Each application is directed to different inventions.

FIELD OF THE INVENTION

The subject invention generally relates to a rheology control agent. More specifically, the subject invention relates to a rheology control agent for use in a coating composition, a method of preparing the rheology control agent, and a coating composition utilizing the rheology control agent.

BACKGROUND OF THE INVENTION

Rheology control agents (RCAs) and their uses are known in the art. RCAs are incorporated into coating compositions primarily to improve resistance to sag, i.e., rheology control. RCAs present in the prior art include bis urea crystals, which are the reaction product of a diisocyanate and an amine, and fumed silica.

These conventional RCAs, and other RCAs, have proven to be inadequate for incorporation into coating compositions for a variety of reasons. For instance, fumed silica RCAs are inert relative to the cross-linking agent of the coating composition. That is, these conventional RCAs do not react with the cross-linking agent. As a result, these conventional RCAs do not participate in the cross-linking reaction to further enhance the integrity of the film produce upon application and cure of the coating composition. Furthermore, primarily because there is no chemical reaction, i.e., cross-linking, between the conventional RCAs and either the resin or the cross-linking agent, these conventional RCAs are frequently detrimental to other properties of the film including, but not limited to, adhesion, re-coat adhesion, and appearance.

Although other conventional RCAs, such as bis urea crystal RCAs, are reactive with the cross-linking agent, these conventional RCAs are inadequate because they require highly stringent manufacturing and processing specifications to achieve optimum rheology control in the coating composition. For instance, bis urea crystal RCAs must have a certain particle size and also must be finely dispersed into a resin to achieve optimum rheology control. Bis urea crystal RCAs are also highly sensitive to polar solvents and, as a result, lose most of their rheology control in the presence of alcohols which are commonly incorporated into coating compositions.

Finally, the levels at which the RCAs of the prior art are incorporated into coating compositions to be effective in resisting sag are frequently so high that the VOC content of the coating composition is impractical for application in industry.

In sum, the RCAs of the prior art, including those described above, are characterized by one or more inadequacy. Due to the inadequacies identified in the prior art, it is desirable to provide a novel rheology control agent that is reactive with a cross-linking agent in a coating composition and that resists sag while maintaining other properties of the coating composition and of a film of the coating composition.

SUMMARY OF THE INVENTION

A rheology control agent (RCA) is disclosed. The RCA is used in a coating composition, which comprises a resin and a cross-linking agent, to improve resistance to sag. More specifically, the RCA is reactive with the cross-linking agent of the coating composition. The RCA of the subject invention comprises the reaction product of a first compound comprising a plurality of hydroxyl groups, a lactone compound, and a carbamate compound.

A method of preparing the RCA is also disclosed. According to this method, the first compound is provided, and at least one of the hydroxyl groups of the first compound is reacted with the lactone compound to form an intermediate compound terminating with a second plurality of hydroxyl groups. Once the intermediate compound is formed, at least one of the hydroxyl groups of the second plurality is reacted with the carbamate compound to prepare the RCA of the subject invention.

A primary object of this invention is to develop an RCA that is suitable for participation in the cross-linking reaction of the coating composition. By first reacting with the cross-linking agent present in the coating composition, the RCA of the subject invention satisfies this object. Finally, films produced upon application and cure of coating compositions utilizing the RCA of the subject invention have improved appearance, such as improved distinctiveness and gloss.

DETAILED DESCRIPTION OF THE INVENTION

The rheology control agent (RCA) of the subject invention, a carbamate-functional RCA, is used as an additive that is incorporated into a coating composition primarily to resist sag. The coating composition, which includes a resin and a cross-linking agent in addition to the RCA, is thixotropic, i.e., the more shear forces induced upon the coating composition, the less viscous the coating composition becomes. The RCA of the subject invention includes an organic structure having carbamate functionality which enables the RCA to chemically react with the cross-linking agent of the coating composition when the RCA is incorporated into the coating composition.

The RCA is generally the reaction product of a first compound comprising a plurality of hydroxyl groups, a lactone compound, and a carbamate compound. In one particular embodiment, the carbamate-functional RCA is more specifically the reaction product of a star polyol comprising a first plurality of hydroxyl groups, a lactone compound that is reactive with the first plurality of hydroxyl groups to form an intermediate compound that terminates with a second plurality of hydroxyl groups, and a carbamate compound which comprises at least one carbamate group reactive with the second plurality of hydroxyl groups.

The method of preparing the RCA agent includes the steps of providing the first compound having the plurality of hydroxyl groups, reacting at least one of the hydroxyl groups of the first compound with the lactone compound to form the intermediate compound that terminates with the second plurality of hydroxyl groups, and reacting at least one of the hydroxyl groups of the second plurality with the carbamate compound to prepare the RCA. The method steps of the subject invention are preferably conducted at temperatures between 50° C. and 200° C., more preferably between 100° C. and 150° C. This method is described in further detail below.

To prepare the RCA of the subject invention, the first compound is selected to maximize the number of hydroxyl groups, i.e., the hydroxyl functionality, in the first compound while establishing a foundation for the organic structure of the RCA. The hydroxyl groups of the first compound can be primary, secondary, and/or tertiary hydroxyl groups. Although not required, it is preferred that the plurality of hydroxyl groups of the first compound is at least three hydroxyl groups. Preferably, the first compound is present in the RCA in an amount from 2 to 20, more preferably from 5 to 15, parts by weight based on 100 parts by weight of the RCA.

In one embodiment of the subject invention, the first compound is at least one of a diol, triol, tetrol, or sugar alcohol. Therefore, in this embodiment it is implicit that the first compound can also be any blend of the diols, triols, tetrols, or sugar alcohols. Furthermore, in this embodiment, the first compound can suitably be an aliphatic, a cycloaliphatic, or an aromatic diol, triol, or tetrol.

Diols suitable as the first compound include straight chain diols with 2-18 carbon atoms. Examples include, without limitation, 1,3-propanediol, 1,2-ethanediol, 1,4-butanediol, 1,5-pentanediol, and 1,6-hexanediol. Other suitable diols include, but are not limited to, diethylene glycol, triethylene glycol, polyethylene glycols, dipropylene glycol, tripropylene glycol and polypropylene glycols.

The diols can also be branched such as, for instance, dimethylolpropane, neopentyl glycol, 2-propyl-2-methyl-1, 3-propanediol, 2-butyl-2-ethyl-1,3-propanediol, 2,2-diethyl-1,3-propanediol, 2,2,4-trimethylpentane-1,3-diol, trimethylhexane-1,6-diol, and 2-methyl-1,3-propanediol.

Cycloaliphatic diols such as cyclohexane dimethanol and cyclic formals of pentaerythritol such as, for instance, 1,3-dioxane-5,5-dimethanol can also be used.

Aromatic diols, for instance 1,4-xylylene glycol and 1-phenyl-1,2-ethanediol, as well as reaction products of polyfunctional phenolic compounds and alyklene oxides or derivatives thereof, can furthermore be employed. Bisphenol A, hydroquinone, and resorcinol may also be used.

Diols of the ester type, for example neopentylhydroxypivalate, are also suitable diols.

As substitute for a 1,2-diol, the corresponding 1,2-epoxide or an α-olefin oxide can be used. Ethylene oxide, propylene oxide, 1,2-butylene oxide, and styrene oxide can serve as examples of such compounds.

Suitable triols can contain three primary hydroxyl groups. Trimethylolpropane, trimethylolethane, trimethylobutane, and 3,5,5-trimethyl-2,2-dihydroxymethylhexane-1-ol are examples of this type of triols. Other suitable triols are those having two types of hydroxyl groups, primary as well as secondary hydroxyl groups, as for instance glycerol and 1,2,6-hexanetriol. It is also possible to use cycloaliphatic and aromatic triols and/or corresponding adducts with alkylene oxides or derivatives thereof.

Suitable tetrols for use as the first compound include, without limitation, pentaerythritol, ditrimethylolpropane, diglycerol and ditrimethylolethane. It is also possible to use cycloaliphatic and aromatic tetrols as well as corresponding adducts with alkylene oxides or derivatives thereof.

In other embodiments, the first compound is at least one of erythritol, pentaerythritol, dipentaerythritol, trimethylolethane, trimethylolpropane, trimethylolbutane, glycerol, ditrimethylolethane, ditrimethylolpropane, diglycerol, dulcitol, threitol, sorbitol, and mannitol.

In the most preferred embodiment of the subject invention, the first compound comprises pentaerythritol. For descriptive purposes, a chemical representation of pentaerythritol is disclosed below.

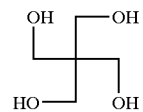

In view of the characteristics described above for the first compound, other equivalent compounds include, but are not limited to, ethylene glycol and propylene glycol, which each provide two hydroxyl groups, and glycerol, which provides three hydroxyl groups. Other alcohols, sugars, and acids providing a plurality of hydroxyl groups are also suitable as the first compound. Examples of such acids include, but are not limited to, dimethylpropionic acid (DMPA), tartaric acid, and citric acid.

As described initially above, the star polyol may be included in the reaction to prepare the carbamate-functional RCA. That is, the first compound may be a star polyol. Star polyols are frequently described in different manners. For instance, a star polyol can be described as a monomeric polyol containing four or more primary or secondary hydroxyl groups. Alternatively, a star polyol can be described as a macromolecule containing a single branch point from which linear chains, or arms, emanate. A star polyol can also be described as a macromolecule containing a constitutional unit from which more than two chains, or arms, emanate.

Examples of star polyols include, without limitation, pentaerythritol, ditrimethylolpropane, dipentaerythritol, tetrakis (2-hydroxyethyl) methane, diglycerol, trimethylolethane, xylitol, glucitol, dulcitol, and sucrose. Mixtures of star polyols may also form the hydroxy initiating compound of the carbamate-functional RCA of the present invention.

Alternatively, the first compound may be based on a hyperbranched polyol that is prepared by the reaction of an initial compound having two or more hydroxyl groups and a second compound having one carboxyl group and two or more hydroxyl groups. The first and second compounds can be reacted to form the hyperbranched polyol.

As initially described above, the RCA of the subject invention is also the reaction product of the lactone compound. More specifically, the lactone compound reacts with at least one of the hydroxyl groups of the plurality of the first compound to form the intermediate compound which terminates with the second plurality of hydroxyl groups. The lactone compound is present in the RCA in an amount from 35 to 70, more preferably from 40 to 65, parts by weight based on 100 parts by weight of the RCA.

In one embodiment, the lactone compound can be described to have the general formula

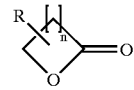

wherein n is a positive integer from 1 to 7, and R is one or more hydrogen atoms, or substituted or unsubstituted alkyl groups having from 1 to 7 carbon atoms. In alternative embodiments, the lactone compound is at least one of ε-caprolactone, γ-caprolactone, β-butyrolactone, β-propiolactone, γ-butyrolactone, α-methyly-γ-butyrolactone, β-methyly-γ-butyrolactone, γ-valerolactone, δ-valerolactone, γ-nonanoic lactone, γ-octanoic lactone, and pentolactone.

In the most preferred embodiment of the subject invention, the lactone compound comprises ε-caprolactone. For descriptive purposes, a chemical representation of ε-caprolactone is disclosed below.

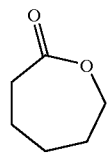

At least one of the hydroxyl groups of the first compound, in the most preferred embodiment, pentaerythritol, is reacted with the lactone compound, in the most preferred embodiment ε-caprolactone, to form the intermediate compound. As described above, the intermediate compound terminates with the second plurality of hydroxyl groups. In this reaction, the molar ratio of the lactone compound to the first compound is from 2:1 to 20:1, more preferably from 4:1 to 8:1. When pentaerythritol is utilized as the first compound, it is preferred that either four moles of ε-caprolactone or 8 moles of ε-caprolactone are reacted with the pentaerythritol. For descriptive purposes, a chemical representation of the intermediate compound resulting from the reaction of one mole of pentaerythritol and four moles of ε-caprolactone is disclosed below.

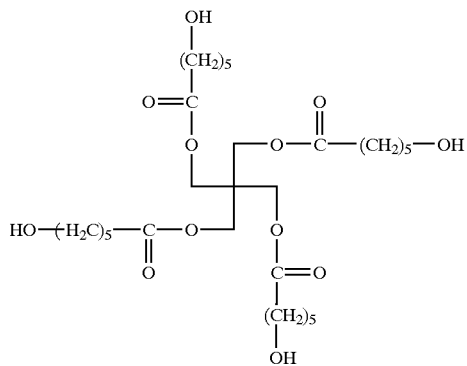

Of course, it is understood by those of ordinary skill in the art that the above chemical representation is ideal in that it assumes that one mole of ε-caprolactone reacts with each of the four hydroxyl groups of the pentaerythritol. Although not disclosed in a chemical representation such as that disclosed immediately above, alternative embodiments could include more than one mole of ε-caprolactone reacting at one of the hydroxyl groups such that at least one of the hydroxyl groups of the pentaerythritol remains unreacted.

The chemical representation of the intermediate compound resulting from the reaction of one mole of pentaerythritol and eight moles of ε-caprolactone is disclosed below.

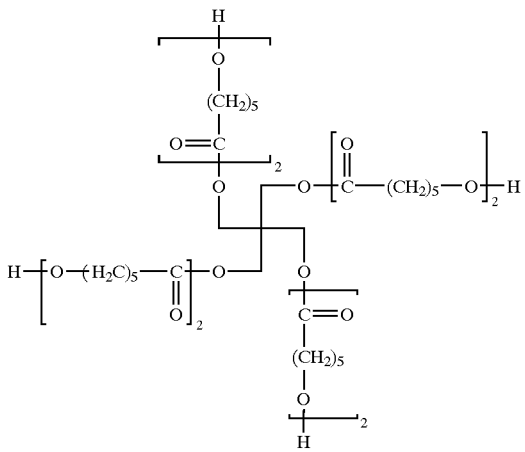

Of course, it is understood by those of ordinary skill in the art that the above chemical representation is ideal in that it assumes that two moles of ε-caprolactone react with each of the four hydroxyl groups of the pentaerythritol. Although not disclosed in a chemical representation such as that disclosed immediately above, alternative embodiments could include more than two moles of ε-caprolactone reacting at one of the hydroxyl groups such that at least one of the hydroxyl groups of the pentaerythritol remains unreacted.

The two chemical representations of the intermediate compound disclosed above are merely illustrative of the subject invention. The intermediate compound disclosed above has a four-branch organic structure originally derived from the organic structure of the pentaerythritol. It is to be understood that if an alternative first compound is selected, such as dipentaerythritol which provides six hydroxyl groups, then the intermediate compound would have a six-branch organic structure derived from the structure of the dipentaerythritol. Of course, either six or twelve moles of the lactone compound then would be selected to react with the six hydroxyl groups of the dipentaerythritol.

Next, at least one of the hydroxyl groups of the second plurality, i.e., from the intermediate compound, are reacted with the carbamate compound to prepare the RCA. More specifically, the carbamate compound has at least one carbamate group, and it is the carbamate groups of the carbamate compound that react with the hydroxyl groups. The carbamate compound is present in the RCA in an amount from 10 to 45, preferably from 15 to 40, and most preferably from 18 to 37, parts by weight based on 100 parts by weight of the RCA. Also, in this reaction, the molar ratio of the carbamate compound to the lactone compound is from 1:8 to 2:1. Most preferably, this ratio is 1:1.

In one embodiment, the carbamate compound is an alkyl carbamate having from 1 to 20 carbon atoms in the alkyl chain. For example, the carbamate compound may be generically defined as

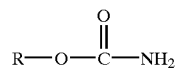

where R is an alkyl chain having from 1 to 20 carbon atoms. In alternative embodiments, the carbamate compound more specifically includes at least one of methyl carbamate, ethyl carbamate, propyl carbamate, and butyl carbamate.

In the most preferred embodiment of the subject invention, the carbamate compound comprises methyl carbamate [CH$_3$OC(O)NH$_2$]. Other carbamate compounds include, but are not limited to, propylene glycol monocarbamate, and the like.

The completed RCA, prepared from one mole of pentaerythritol, four moles of $\epsilon$-caprolactone, and four moles of methyl carbamate, is disclosed below.

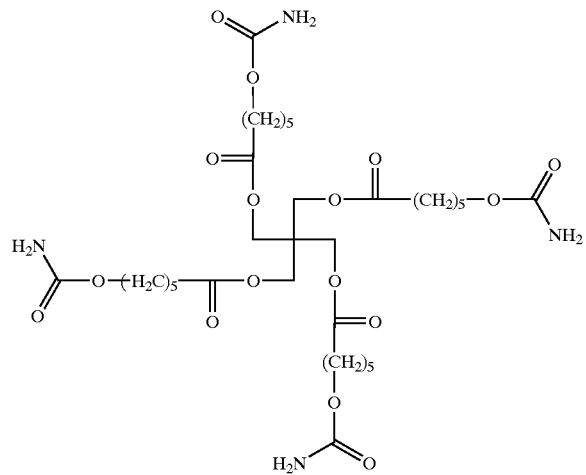

The completed RCA set forth immediately above assumes that one of the four moles of methyl carbamate reacts with each hydroxyl groups of the second plurality, i.e., of the intermediate compound. Of course, it is to be understood that these parameters are ideal reaction conditions that do not always occur such that some of the hydroxyl groups of the second plurality may remain unreacted.

The completed RCA, prepared from one mole of pentaerythritol, eight moles of $\epsilon$-caprolactone, and four moles of methyl carbamate, is disclosed below.

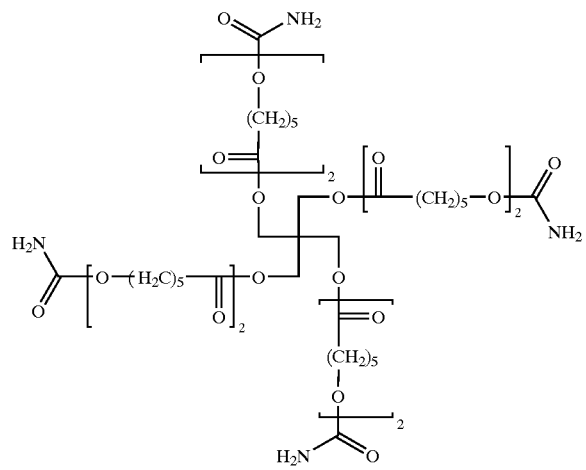

Similar to that described above, the completed RCA set forth immediately above assumes that one of the four moles of methyl carbamate reacts with each hydroxyl of the second plurality, i.e., of the intermediate compound. Of course, it is to be understood that these parameters are ideal reaction conditions that do not always occur such that some of the hydroxyl groups of the second plurality may remain unreacted.

As shown above in either of the embodiments, the completed RCA is a carbamate-functional RCA, a polyester tetracarbamate, having a four-branch organic structure.

Of course, in terms of the preferred embodiment, after the four moles of methyl carbamate react with the hydroxyl groups of the intermediate compound to prepare the RCA, four moles of methanol are produced as a side product. The number of moles of alcohol that are produced as a side product vary depending on the number of moles of the carbamate compound, preferably the methyl carbamate, that are reacted with the intermediate compound.

In either of the embodiments, it is preferred that the total number of moles of the carbamate compound is generally equal to the number of hydroxyl groups in the intermediate compound such that all of the hydroxyl groups are reacted. In the event the total number of moles of the carbamate compound is less than the number of hydroxyl groups in the intermediate compound, some of the hydroxyl groups will remain unreacted and the completed RCA will have both hydroxyl and carbamate functionality.

The RCA of the subject invention preferably has a theoretical weight-average molecular weight, $M_W$, of from 250 to 4000, more preferably from 500 to 2,000, and most preferably from 750 to 1500. Additionally, the completed RCA according to the subject invention has a non-volatile content of from 60 to 80, preferably from 65 to 75, percent non-volatile by weight.

As understood by those skilled in the art, the RCA may optionally include additives to effect the reaction or to effect certain properties of the RCA and of the coating composition. Such additives include, but are not limited to, solvents, catalysts, and combinations thereof. As a non-limiting, specific example, the RCA may include stannous octoate or di-butyltin oxide as a catalyst.

The coating composition includes the resin, the cross-linking agent, and the RCA described above. The resin includes a functional group, and the cross-linking agent is preferably reactive with the functional group of the resin. However, as described below, the cross-linking agent is not required to be reactive with the functional group of the resin. Instead, the cross-linking agent of the subject invention is only required to be reactive with the RCA. The RCA is utilized as an additive to the coating composition to introduce sag resistance into the coating composition, which is most preferably a solventborne clearcoat. As an additive, the RCA is present in the coating composition in an amount from 1 to 25, preferably from 2 to 20, and more preferably from 5 to 15, parts by weight based on 100 parts by weight of the coating composition.

The resin may include an oligomer such as a dimer, trimer, or tetramer. As known to those skilled in the art, oligomers are polymer molecules having only a few monomer units and generally have low molecular weights. As a non-limiting example, certain polyester resins may be the oligomer.

The resin in the coating composition may also include at least one of an acrylic resin, epoxy resin, phenolic resin, polyester resin, polyurethane resin, acrylate resin, methacrylate resin, and polysiloxane resin. As understood by those skilled in the art, each of these types of resins contains a respective functional group. Specific examples of these resins include epoxy esters, fluoropolymers such as fluorinated acrylic resins, and various resins having silicone appendages. As initially described above, the resin is preferably cross-linkable with the cross-linking agent. However, when the resin is an acrylate resin or a methacrylate resin, for example, the resin may not participate in cross-linking with the cross-linking agent. Instead, the resin may self cross-link in response to UV curing.

In any of the embodiments, the resin is present in the coating composition in an amount from 30 to 70, preferably from 44 to 64, and more preferably from 49 to 59, parts by weight based on 100 parts by weight of the coating composition.

The cross-linking agent may include at least one of a polyacid, polyanhydride, polyisocyanate, polyamine, acetoacetate, polyaziridine, and polysiloxane. More specific examples of such cross-linking agents include, but are not limited to, polycarboxylic acids, acid anhydrides, and blocked and unblocked isocyanates.

Preferably, the cross-linking agent comprises an aminoplast resin. Aminoplast resins include urea resins and melamine formaldehyde resins. In the present invention, the most preferred cross-linking agent utilized in the coating composition that incorporates the RCA is a melamine formaldehyde resin, which is described below.

In any of the embodiments, the cross-linking agent is present in the coating composition in an amount from 1 to 20, preferably from 2 to 10, and more preferably from 4 to 8, parts by weight based on 100 parts by weight of the coating composition.

The melamine formaldehyde resins of the preferred embodiment include either a methylol group, $CH_2OH$, an alkoxymethyl group, or both. The alkoxymethyl group is of the general formula $—CH_2OR_1$, where $R_1$ is an alkyl chain having from 1 to 20 carbon atoms. As understood by those skilled in the art, the methylol groups and the alkoxymethyl groups are reactive with the carbamate functional groups present in the completed RCA. That is, the RCA of the subject invention, as an additive is thus able to participate in the cross-linking reaction between the cross-linking agent and the resin by first chemically reacting with the cross-linking agent. Therefore, this RCA is not inert.

Other cross-linking agents that are aminoplasts include benzaquanimine and glycolurals. Further possible cross-linking agents that are melamine resins include, but are not limited to, monomeric and polymeric melamine formaldehyde resins, including both partially and fully alkylated melamines such as methylated melamines, butylated melamines, and methylated/butylated melamines. Other cross-linking agents that are urea resins include methylol ureas such as urea formaldehyde resins, and alkoxy ureas such as butylated urea formaldehyde resin.

The preferred embodiment of the subject invention includes hexamethoxymethyl melamine (HMMM). HMMM is commercially available from Monsanto (Solutia) under its Resimene Amino Crosslinker Resins as Resimene 747. HMMM is shown in the following chemical representation.

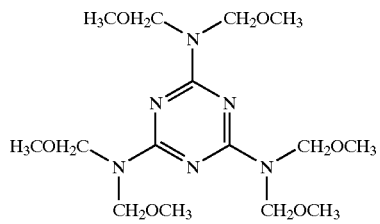

Upon addition, the carbamate groups present in the completed RCA react with some of the alkoxymethyl, i.e., ether, groups of the HMMM, specifically the $CH_2OCH_3$ groups, thereby establishing urethane (—NH—CO—O—) linkages. Upon application and cure, the cross-linking agent, in the preferred embodiment HMMM, and chemical compounds of the cross-linking agent with pendant RCAs attached, cross-link with the functional groups of the resin to form a cured film of the coating composition.

The coating composition of the subject invention may include a resin, a cross-linking agent that is reactive with the resin, and an RCA that is reactive with the cross-linking agent. Alternatively, the coating composition of the subject invention may include a resin, a cross-linking agent that does not react with the resin (e.g. the resin is self cross-linking), and an RCA that is reactive with the cross-linking agent. That is, the cross-linking agent is reactive with the RCA and not with the resin. In a further alternative embodiment contemplated within the subject invention, the coating composition may include a resin, a first cross-linking agent that is reactive with the resin, a second cross-linking agent, i.e., the cross-linking agent of the subject invention, and an RCA that is reactive with the second cross-linking agent. In other words, the primary cross-linking mechanism occurs between the resin and the first cross-linking agent, and the second cross-linking agent is incorporated into the coating composition as an additive to cross-link with the RCA and not necessarily to cross-link with the resin. In this alternative embodiment, it is most preferred that the second cross-linking agent is an aminoplast resin.

It is to be understood that all of the preceding chemical representations are merely two-dimensional chemical representations and that the structure of these chemical representations may be other than as indicated.

The following examples illustrating the formation of and the use of the carbamate-functional RCA of the subject invention, as presented herein, are intended to illustrate and not limit the invention.

EXAMPLE 1

In Example 1, the RCA was prepared by adding and reacting the following parts, by weight, unless otherwise indicated.

TABLE 1A

| Reactant | Target Amount (moles) | Target Amount (grams) | Actual Amount (grams) |
|---|---|---|---|
| Pentaerythritol [PE] | 1.0 | 272.0 | 272.3 |
| ε-caprolactone [E-cap] | 4.0 | 912.0 | 921.0 |
| Toluene | — | 131.0 | 131.0 |
| Stannous octoate | — | 0.8 | 0.8 |
| TOTAL | — | 1315.8 | 1325.1 |

Per the above table, Table 1A, 272.3 grams of PE, 921.0 grams of E-cap, 131.0 grams of toluene, and 0.8 grams of stannous octoate were added in a reaction flask to form the intermediate compound. The reaction flask was heated with a conventional heat supply to a temperature of 155° C. The temperature of the reaction flask was maintained at this temperature for 6 hours for a complete reaction. The hydroxyl number was titrated to be 368 mg KOH/G versus a theoretical value of 379 mg KOH/G.

TABLE 1B

| Reactant | Target Amount (moles) | Target Amount (grams) | Actual Amount (grams) |
|---|---|---|---|
| Intermediate Compound [from Table 1A] | 1.0 | 650.0 | 650.0 |
| Methyl carbamate | 4.0 | 330.0 | 330.0 |
| Toluene | — | 100.0 | 100.0 |
| Dibutyltin oxide [DBTO] | — | 0.9 | 0.9 |
| TOTAL | — | 1080.9 | 1080.9 |

Per the above table, Table 1B, 650.0 grams of the intermediate compound from Table 1A, 330.0 grams of methyl carbamate, 100.0 grams of toluene, and 0.9 grams of dibutyltin oxide were added in a reaction flask to form the RCA of the subject invention. The reaction flask was heated with a conventional heat supply to a temperature between 120° C. and 130° C. for approximately 26 hours. During this time, side product methanol was removed as an azeotrope with toluene. Completion of the reaction was followed by titrating for the hydroxyl number. The final hydroxyl number was 32 mg KOH/G, amounting to 91% completion.

After this time period, vacuum stripping was carried out to remove solvent and unreacted methyl carbamate. The final amount of methyl carbamate in the RCA was measured by gas chromatography to be <0.2%. About 600 grams of propylene glycol methyl ether solvent were loaded to the near 100% solids RCA to achieve a final RCA with 70% solids. GPC molecular weights were $M_n$=1470, $M_W$=1780, and D=1.2, based on polystyrene standards. When this RCA was incorporated into a polyacrylic resin, via hand blending at room temperature, in a 1:2 ratio, the combination product of the RCA and the polyacrylic resin demonstrated thixotropic behavior, i.e., a thixotropic viscosity, as known to those skilled in the art and as measured with a Bohlin Viscometer. Thixotropic behavior was evaluated versus known thixotropic resins.

EXAMPLE 2

In Example 2, the RCA was prepared by adding and reacting the following parts, by weight, unless otherwise indicated.

TABLE 2A

| Reactant | Target Amount (moles) | Target Amount (grams) | Actual Amount (grams) |
|---|---|---|---|
| Pentaerythritol [PE] | 1.0 | 136.0 | 204.0 |
| ε-caprolactone [E-cap] | 8.0 | 912.0 | 1370.8 |
| Toluene | — | 117.0 | 176.0 |
| Stannous octoate | — | 0.75 | 1.4 |
| TOTAL | — | 1165.75 | 1752.20 |

Per the above table, Table 2A, 204.0 grams of PE, 1370.8 grams of E-cap, 176.0 grams of toluene, and 1.4 grams of stannous octoate were added in a reaction flask to form the intermediate compound. The reaction flask was heated with a conventional heat supply to an initial temperature of 150° C. Within 1 hour, the temperature of the reaction flask was increased to 155° C. The temperature of the reaction flask was maintained at this temperature for an additional 5 hours, for a total reaction time of approximately 6 hours. The hydroxyl number was titrated to be 214 mg KOH/G.

TABLE 2B

| Reactant | Target Amount (moles) | Target Amount (grams) | Actual Amount (grams) |
|---|---|---|---|
| Intermediate Compound [from Table 2A] | 1.0 | 750.0 | 750.8 |
| Methyl carbamate | 4.3 | 231.0 | 231.0 |
| Toluene | — | 200.0 | 200.0 |
| Dibutyltin oxide [DBTO] | — | 1.0 | 1.0 |
| TOTAL | — | 1182.0 | 1182.8 |

Per the above table, Table 2B, 750.0 grams of the intermediate compound from Table 2A, 231.0 grams of methyl carbamate, 200.0 grams of toluene, and 1.0 gram of dibutyltin oxide were added in a reaction flask to form the RCA of the subject invention. The reaction flask was heated with a conventional heat supply to a temperature between 120° C. and 130° C. for approximately 28 hours. During this time, side product methanol was removed as an azeotrope with toluene. Completion of the reaction was followed by titrating for the hydroxyl number. The final hydroxyl number was 17 mg KOH/G, amounting to 92% completion.

After this time period, vacuum stripping was carried out to remove solvent and unreacted methyl carbamate. The final amount of methyl carbamate in the RCA was measured by gas chromatography to be <0.2%. About 310 grams of propylene glycol methyl ether solvent were loaded to the near 100% solids RCA to achieve a final RCA with 70% solids. GPC molecular weights were $M_n$=1910, $M_W$=2500, and D=1.3, based on polystyrene standards. When this RCA was incorporated into a polyacrylic resin, via hand blending at room temperature, in a 1:2 ratio, the combination product of the RCA and the polyacrylic resin demonstrated thixotropic behavior, i.e., a thixotropic viscosity, as known to those skilled in the art and as measured with a Bohlin Viscometer. Thixotropic behavior was evaluated versus known thixotropic resins.

EXAMPLE 3

In Example 3, a coating composition, specifically a clearcoat coating composition including the RCA from Example 1 was prepared by adding and reacting the following parts, by weight, unless otherwise indicated. It is noteworthy that, in contrast to other RCAs such as the control RCA, the RCA of the subject invention was simply stirred into coating composition. No grinding or high sheer mixing was necessary to appropriately incorporate this RCA into the coating composition.

TABLE 3

| Reactant | Example 3 - Control Actual Amount (grams) | Example 3 Actual Amount (grams) |
|---|---|---|
| Resin | 214.39 | 206.61 |
| Cross-Linking Agent | 26.48 | 26.15 |
| RCA [from Tables 1A and 1B] | 0.0 | 35.71 |
| Control RCA | 40.49 | 0.0 |
| Light Stabilizer A | 20.00 | 20.00 |
| Light Stabilizer B | 3.00 | 3.00 |
| Flow Additive | 1.00 | 1.00 |
| Catalyst | 9.60 | 9.60 |
| Solvent A | 27.00 | 27.00 |
| Solvent B | 42.95 | 64.80 |

Resin is an acrylic carbamate resin commercially available as 342CD0791 from BASF Corporation, Southfield, Mich.

Cross-Linking Agent is a melamine-formaldehyde resin commercially available as Resimene® 747 from Monsanto (Solutia).

RCA is from Example 1 above.

Control RCA is a fumed silica RCA commercially available as Aerosil® Fumed Silica from Degussa-Huls.

Light Stabilizers A and B are ultra-violet light absorbers and are commercially available from Ciba Specialty Chemicals as Tinuvin® 928 and Tinuvin® 123, respectively.

Flow Additive is a polysiloxane flow additive.

Catalyst is a blocked acid catalyst (DDBSA) commercially available from King Industries as Nacure® 5225.

Solvent A is methyl propyl ketone and Solvent B is SC-100 (aromatic naptha).

After standard solvent reduction to optimize spray viscosity, the control and the coating composition prepared pursuant to the reactants listed in Table 3 was sprayed over a white waterborne basecoat WBBC commercially available as E54WW101 from BASF Corporation, Southfield, Mich. to evaluate solvent pop and clearcoat sag results.

For solvent pop, the WBBC was sprayed onto a panel to a constant film build of approximately 1.0 mils, and the reduced coating composition was sprayed in a film build wedge of increasing mils. After a timed ambient flash of 2 minutes, the panel was immediately placed into a conventional oven at 275° F. until cure. The film build of the clearcoat coating composition was evaluated for the film build at the onset, i.e., the initiation, of solvent pop. The solvent pop results, compared to the control are disclosed below in Table 4.

For clearcoat sag, the reduced clearcoat coating composition was sprayed onto a 4×18" keyhole panel in a film build wedge of increasing mils. This panel was then flashed and placed into a conventional oven, in a vertical position, at 275° F. until cure. The film build of the clearcoat coating composition was evaluated for the film build at ¼ in. sag below any keyhole. The clearcoat sag results, compared to the control are disclosed below in Table 4.

TABLE 4

| Test | Example 3 - Control (mils) | Example 3 (mils) |
|---|---|---|
| Solvent Pop | 2.2 | 2.5 |
| Clearcoat Sag | 1.3 | 1.4 |

As the data in Table 4 discloses, the solvent pop and clearcoat sag results for Example 3 are acceptable, i.e., comparable to the control.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A coating composition comprising:
   (A) a resin comprising a functional group;
   (B) a cross-linking agent; and
   (C) a rheology control agent reactive with said cross-linking agent and comprising the reaction product of;
      (i) a first compound comprising at least three hydroxyl groups,
      (ii) a lactone compound, and
      (iii) a carbamate compound.

2. A coating composition as set forth in claim 1 wherein said resin comprises at least one of an acrylic resin, epoxy resin, phenolic resin, polyester resin, polyurethane resin, acrylate resin, methacrylate resin, and polysiloxane resin.

3. A coating composition as set forth in claim 1 wherein said resin comprises an oligomer.

4. A coating composition as set forth in claim 1 wherein said cross-linking agent comprises at least one of a polyacid, polyanhydride, polyisocyanate, polyamine, acetoacetate, polyaziridine, and polysiloxane.

5. A coating composition as set forth in claim 1 wherein said cross-linking agent comprises an aminoplast resin.

6. A coating composition as set forth in claim 5 wherein said aminoplast resin comprises a melamine formaldehyde resin.

7. A coating composition as set forth in claim 1 wherein said resin is present in an amount from 30 to 70 parts by weight based on 100 parts by weight of said coating composition.

8. A coating composition as set forth in claim 1 wherein said cross-linking agent is present in an amount from 1 to 20 parts by weight based on 100 parts by weight of said coating composition.

9. A coating composition as set forth in claim 1 wherein said rheology control agent is present in an amount from 1 to 25 parts by weight based on 100 parts by weight of said coating composition.

10. A coating composition as set forth in claim 1 wherein said first compound comprises at least one of erythritol, pentaerythritol, dipentaerythritol, trimethylolethane, trimethylolpropane, trimethylolbutane, glycerol, ditrimethylolethane, ditrimethylolpropane, diglycerol, dulcitol, threitol, sorbitol, and mannitol.

11. A coating composition as set forth in claim 1 wherein said lactone compound comprises at least one of ε-caprolactone, γ-caprolactone, β-butyrolactone, β-propiolactone γ-butyrolactone, α-methyl-γ-butyrolactone, β-methyl-γ-butyrolactone, γ-valerolactone, δ-valerolactone, γ-nonanoic lactone, γ-octanoic lactone, and pentolactone.

12. A coating composition as set forth in claim 1 wherein the molar ratio of said lactone compound to said first compound is from 2:1 to 20:1.

13. A coating composition as set forth in claim 1 wherein said carbamate compound comprises an alkyl carbamate having from 1 to 20 carbon atoms in the alkyl chain.

14. A coating composition as set forth in claim 1 wherein the molar ratio of said carbamate compound to said lactone compound is from 1:8 to 2:1.

15. A coating composition as set forth in claim 1 wherein said cross-linking agent is reactive with said functional group of said resin.

16. A coating composition comprising:
   (A) a resin comprising a functional group;
   (B) a cross-linking agent; and
   (C) a rheology control agent reactive with said cross-linking agent and comprising the reaction product of;
      (i) a first compound comprising pentaerythritol,
      (ii) a lactone compound comprising ε-caprolactone, and
      (iii) a carbamate compound comprising methyl carbamate.

17. A coating composition as set forth in claim 16 wherein said resin comprises at least one of an acrylic resin, epoxy resin, phenolic resin, polyester resin, polyurethane resin, acrylate resin, methacrylate resin, and polysiloxane resin.

18. A costing composition as set forth in claim 16 wherein said resin comprises an oligomer.

19. A coating composition as set forth in claim 16 wherein said cross-linking agent comprises at least one of a polyacid, polyanhydride, polyisocyanate, polyamine, acetoacetate, polyaziridine, and polysiloxane.

20. A coating composition as set forth in claim 16 wherein said cross-linking agent comprises an aminoplast resin.

21. A coating composition as set forth in claim 20 wherein said aminoplast resin comprises a melamine formaldehyde resin.

22. A coating composition as set forth in claim 16 wherein said resin is present in an amount from 30 to 70 parts by weight based on 100 parts by weight of said coating composition.

23. A coating composition as set forth in claim 16 wherein said cross-linking agent is present in an amount from 1 to 20 parts by weight based on 100 parts by weight of said coating composition.

24. A coating composition as set forth in claim 16 wherein said rheology control agent is present in an amount from 1 to 25 parts by weight based on 100 parts by weight of said coating composition.

25. A coating composition as set forth in claim 16 wherein the molar ratio of said lactone compound to said first compound is from 2:1 to 20:1.

26. A coating composition as set forth in claim 16 wherein the molar ratio of said carbamate compound to said lactone compound is from 1:8 to 2:1.

27. A coating composition as set forth in claim 16 wherein said cross-linking agent is reactive with said functional group of said resin.

* * * * *